United States Patent
Krishnamurthy (10) Patent No.: US 7,747,093 B2
(45) Date of Patent: Jun. 29, 2010

(54) METHOD AND APPARATUS FOR PREDICTING THE SIZE OF A COMPRESSED SIGNAL

(75) Inventor: Balaji Krishnamurthy, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 873 days.

(21) Appl. No.: 11/608,027

(22) Filed: Dec. 7, 2006

(65) Prior Publication Data

US 2008/0137739 A1 Jun. 12, 2008

(51) Int. Cl.
*G06K 9/36* (2006.01)
(52) U.S. Cl. .................. 382/238; 375/240.12
(58) Field of Classification Search ................. 382/232, 382/238; 375/240.12
See application file for complete search history.

(56) References Cited

U.S. PATENT DOCUMENTS

| | | | | |
|---|---|---|---|---|
| 6,052,488 | A * | 4/2000 | Takahashi et al. | 382/239 |
| 6,118,903 | A * | 9/2000 | Liu | 382/245 |
| 6,195,462 | B1 | 2/2001 | Bryniarski et al. | |
| 6,600,837 | B1 * | 7/2003 | Shimura et al. | 382/239 |
| 2005/0025370 | A1 | 2/2005 | Koshiba et al. | |
| 2008/0219346 | A1 * | 9/2008 | He et al. | 375/240.03 |

OTHER PUBLICATIONS

U.S. Appl. No. 10/849,409, filed May 17, 2004, 88 pages.
Kenneth R. Castleman, "Digital Reference Processing," 1996 Prentice Hall, Chapter 13 (pp. 281-300), Chapter 17 (pp. 431-442), (Earlier than this application Dec. 7, 2006).

* cited by examiner

*Primary Examiner*—Vikkram Bali
*Assistant Examiner*—Eueng-Nan Yeh
(74) *Attorney, Agent, or Firm*—Robert C Kowert; Meyertons, Hood, Kivlin, Kowert & Goetzel, P.C.

(57) ABSTRACT

Method and apparatus for providing an estimate of the size of a compressed signal without actually compressing the signal. A compression estimation mechanism models the behavior of entropy encoders on the transform coefficients generated by the application of a discrete transform method on an input uncompressed signal. The compression estimation mechanism may be used to predict a lower bound and upper bound on the size of the compressed signal from the entropy encoders, or alternatively an estimated size of the compressed signal. Since embodiments use a model of the behavior of entropy encoders to predict the bounds of the compressed signal or the size of the compressed signal without performing the actual entropy encoding, the bounds or size estimate may be predicted in less time than it takes to perform full compression of the signal.

54 Claims, 6 Drawing Sheets

METHOD AND APPARATUS FOR PREDICTING THE SIZE OF A COMPRESSED SIGNAL

BACKGROUND

1. Field of the Invention

This invention relates to computer systems, and more particularly to data compression mechanisms, specifically transform coding mechanisms as applied to discrete signals.

2. Description of the Related Art

In computer science and information theory, data compression is the process of encoding information using fewer bits than an unencoded representation would use through use of specific encoding schemes. Discrete signals such as discretely sampled audio, video, and images are typically compressed using transform coding. In transform coding, a discrete transform is first performed on the signal to generate a set or vector of transform coefficients. Transform coefficients that are at or near zero may be discarded, and transform coefficients that are small may be coarsely quantized according to one or more quantization factors. Note that quantization may be defined as the representation of a measured value by an integer. This process concentrates meaningful information from the signal in a subset of transform coefficients, which may be referred to as the transformed signal. A lossless entropy encoding scheme or technique may then be applied to the transformed signal to generate a compressed signal, for example a compressed file. Note that transform coding is generally a "lossy" compression scheme. Further note that applications or implementations of transform coders (in hardware, software, or a combination thereof) may sometimes be referred to as "codecs".

Entropy encoding is a coding scheme that assigns codes to symbols to match code lengths with the probabilities of the symbols. Typically, entropy encoders are used to compress data by replacing symbols represented by equal-length codes with symbols represented by codes proportional to the negative logarithm of the probability. Therefore, the most common symbols use the shortest codes.

There are many discrete transform methods that may be used in transform coders. Discrete transform methods include, but are not limited to, forms of discrete Fourier transforms (DFT), discrete cosine transforms (DCT), discrete Hartley transforms (DHT), rectangular wave transforms, eigenvector-based transforms, and wavelet transforms.

Likewise, there are many entropy encoding techniques that may be used in transform coders. Entropy encoding techniques include, but are not limited to, dictionary-based techniques such as run-length encoding (RLE) and LZW encoding, statistical encoding techniques such as Huffman coding, and arithmetic coding. Note that an entropy encoding scheme in a transform coder may use a combination of two or more of the entropy encoding techniques. For example, RLE may first be applied to a signal, followed by Huffman coding.

Commonly used applications of transform coders include, but are not limited to, the JPEG, JPEG2000, and MPEG compression standards. JPEG is an image compression standard created by the Joint Photographic Experts Group that uses a two-dimensional forward discrete cosine transform (DCT, type II) to generate a transformed signal. RLE is then performed on the transformed signal, after which Huffman coding is performed. The JPEG standard also allows for arithmetic coding to be performed rather than Huffman coding. JPEG 2000 is an image compression standard created by the Joint Photographic Experts Group that uses a wavelet transform rather than a DCT transform. MPEG is a video/audio (multimedia) compression standard created by the Moving Picture Experts Group, a working group of ISO/IEC.

Figure 1:
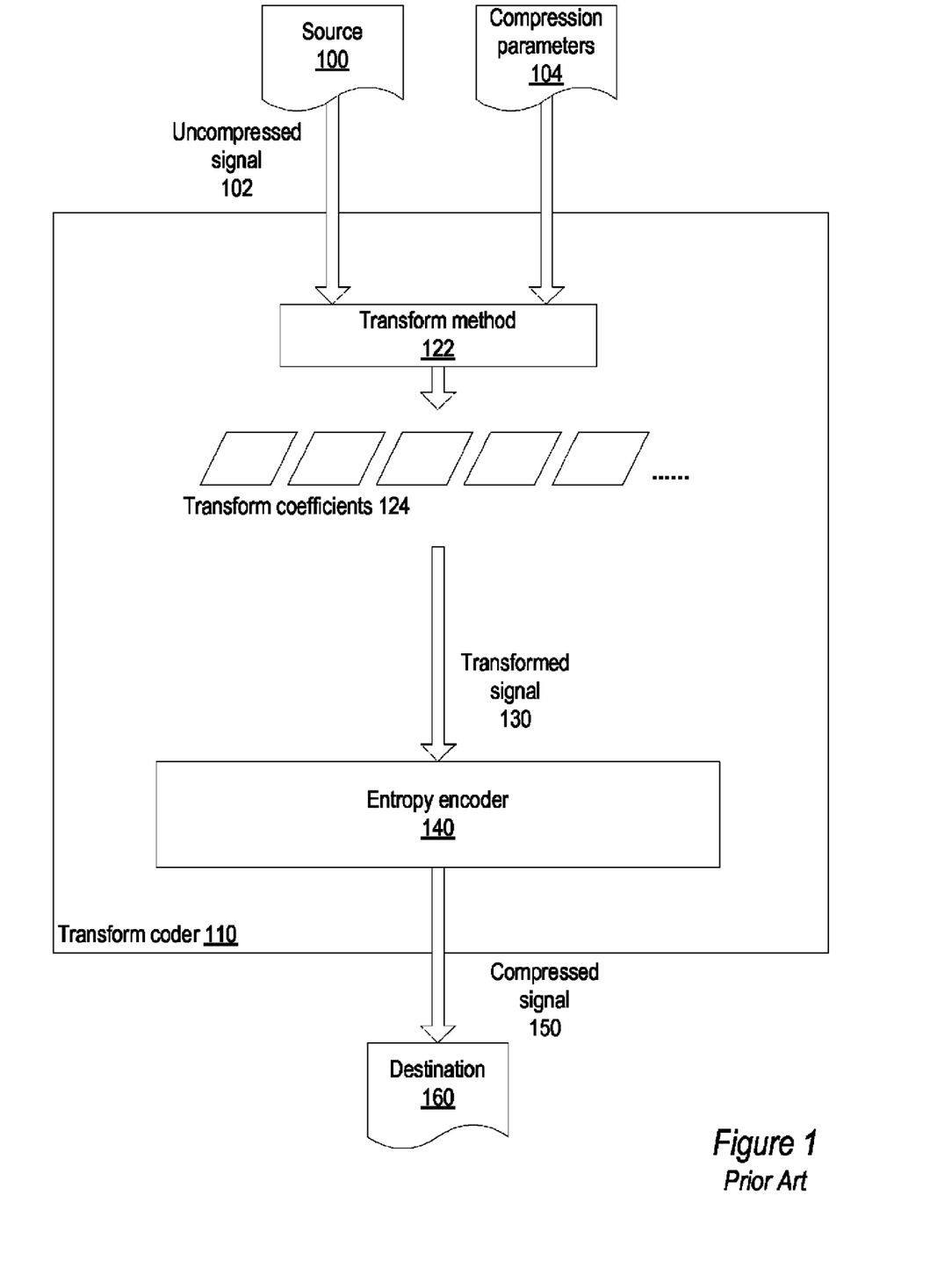
FIG. 1 illustrates data flow for a conventional transform coder.

FIG. 1 illustrates data flow for a conventional transform coder. Inputs to a transform coder 110 may include an uncompressed signal 102 and one or more compression parameters 104. Source 100 of uncompressed signal 102 may be a digitized image (e.g., a digital photograph), a digitized audio stream or audio file, a digital video stream or video segment, etc. Note that uncompressed signal may be a subset or portion of a larger signal, for example a portion of an image, audio stream, or digital video stream. Input compression parameters 104 may include one or more variable parameters that may be used during the compression process. Compression parameters 104 may affect both the compression ratio (the ratio of the size of the output compressed signal 150 to the input uncompressed signal 102) and the quality of the compressed signal 150. Generally, the quality is directly related to the compression ratio; higher rates of compression that generate smaller compressed signals 150 tend to negatively affect the quality of the compressed signals 150.

A discrete transform is performed on the uncompressed signal 102 using a transform method 122 employed by the transform coder 110 and in accordance with the compression parameters 104 to generate a vector of transform coefficients 124. Zero and near-zero coefficients may be discarded, and small coefficients may be quantized, concentrating meaningful information from the uncompressed signal 102 into a subset of transform coefficients 124. After the discrete transform of signal 102 is performed, the transformed signal 130 may then be passed to an entropy encoder 140 that encodes the transform coefficients 124 to generate compressed signal 150. Compressed signal 150 typically goes to a destination 160, e.g. a compressed file or compressed audio or video stream.

In many applications, given an input uncompressed signal 102, an operator or user of a transform coder 110 may desire or need to know the size of the compressed signal 150. For example, a user may have a large image in an image editing application that the user wants to compress and save. The user may have a necessary or desired target size, and may want the compressed signal 150 to be close to that size. Conventionally, determining the compressed size is performed by actually performing the compression to generate the compressed signal 150. If the compressed signal 150 is too large or too small, the user may then adjust the compression parameters 104 and perform the compression again. Thus, conventionally, determining the size of the compressed signal 150 is performed by trial and error, which is time- and compute-intensive.

Some techniques have been developed for predicting the compressed size of a signal that do not require the signal to be fully compressed by the transform coder 110. However, these techniques tend to be designed for specific transform coders, particularly for predicting the performance of specific entropy encoders 140.

SUMMARY

Various embodiments of a method and apparatus for providing an estimate of the size of a compressed signal without actually compressing the signal are described. Embodiments of a compression estimation mechanism may model the behavior of entropy encoders on the transform coefficients generated by the application of a discrete transform method to an input uncompressed signal. This modeling may be used to predict a lower bound and an upper bound on the size of compressed signals generated by the entropy encoders, or alternatively may be used to generate an estimated size of the compressed signals. Since embodiments use a model of the behavior of entropy encoders to predict the bounds of the compressed signal or the size of the compressed signal without performing the actual entropy encoding, the bounds or size estimate may be predicted in less time than it takes to perform full compression of the signal.

Inputs to a transform coder may include an uncompressed signal and one or more compression parameters. The compression parameters may be specified by an operator. Note that the operator may be a software program or alternatively a human operator who may specify the compression parameters via a user interface. The source of the uncompressed signal may be a discretely sampled image, audio stream, video stream, etc. Input compression parameters may include one or more variable parameters that may be used during the compression process. Note that compression parameters may affect both the compression ratio and the quality of the compressed signal. Generally, the quality is directly related to the compression ratio; higher rates of compression that generate smaller compressed signals tend to negatively affect the quality of the compressed signals.

A discrete transform is performed on the uncompressed signal using a transform method employed by the transform coder and in accordance with the compression parameters to generate a vector of transform coefficients. Zero and near-zero coefficients may be discarded, and small coefficients may be quantized, concentrating meaningful information from the signal into a subset of transform coefficients.

The compression estimation mechanism analyzes the transform coefficients, applying formulae that model the behavior of entropy encoders, to generate a size estimate for the compressed signal generated by the entropy encoder. Note that the size estimate may include upper and lower bounds on the size, or alternatively an estimate of the actual size within a percentage or degree of confidence. The size estimate may then be provided to the operator. For example, the size estimate may be displayed on a user interface for viewing by a human operator, or fed back into a software program. The operator may then adjust the compression parameters accordingly, if necessary or desired, to adjust the size of the compressed signal. The operator may perform the process more than once to determine the compression parameters that yield the necessary or desired size of the compressed signal. Once a size estimate is found that is acceptable to the operator, the operator may then signal the transform coder to perform full compression of the input signal to generate a compressed signal.

The modeling of entropy encoders in embodiments of the compression estimation mechanism is based on general performance metrics of entropy encoders, and not on the behavior of a particular entropy encoder, and therefore embodiments are applicable to transform coders in general. Further, embodiments of the compression estimation mechanism are independent of the particular discrete transform method or entropy encoder used by the transform coder. Embodiments of the compression estimation mechanism are generally applicable to predicting the compressed size of input natural signals, but may also be used to predict the compressed size of at least some input synthetic signals.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for providing an estimate of the size of a compressed signal without actually compressing the signal are described. Embodiments are generally applicable to any transform coder, and are independent of the particular discrete transform method or entropy encoder used by the transform coder. In some embodiments, an upper bound and a lower bound on the size of the compressed signal may be predicted by a compression estimation mechanism using a bounds prediction algorithm as described herein. In some embodiments, instead of or in addition to predicting an upper and lower bounds, the compressed size within a percentage or degree of confidence may be predicted by a compression estimation mechanism using a size prediction algorithm as described herein. Some embodiments may provide a compression estimation mechanism that allows an operator or user to select either a bounds prediction or a size prediction, or possibly even both.

In transform coders, entropy encoding of the transformed signal typically is more compute-intensive and takes longer to perform than the discrete transform process. A discrete transform process generally uses a convolution kernel, with the same operations being performed on multiple pieces of the uncompressed input signal, and thus can be massively parallelized. SIMD (Single Instruction, Multiple Data) instruction sets, multi core architectures, and GPUs or other hardware and software techniques may be used to parallelize the discrete transform process. Entropy encoding performs serial processing of the transformed signal, and thus is not a good candidate for parallelization and tends to be a much more compute-intensive process. Entropy coders have to look at and process each coefficient serially.

Embodiments of the compression estimation mechanism may model the behavior of entropy encoders on the transform coefficients of an input signal. This modeling may be used to provide a strong lower bound and upper bound on the size of the compressed signal generated by the entropy encoders, or alternatively an estimated size of the compressed signals. Since embodiments use a model of the behavior of entropy encoders to predict the bounds of the compressed signal or the size of the compressed signal without performing the actual entropy encoding, the bounds or size may be predicted in less time than it takes to perform full compression of the signal. Further, the model is based on general performance metrics of entropy encoders, and not on the behavior of a particular entropy encoder, and therefore the compression estimation mechanism is applicable to transform coders in general.

Note that the input signal may be a natural signal or a synthetic signal. A natural signal is a signal that occurs in nature (images, speech, sound generated by instruments, seismic signals, etc). The statistics of natural signals tend to be different from those of synthetic signals, and thus transform coders may perform differently for natural signals than for synthetic signals. Embodiments of the compression estimation mechanism are generally applicable to predicting the compressed size of input natural signals, but may also be used to predict the compressed size of at least some input synthetic signals.

Note that, while embodiments are generally described herein in regards to transform coders and to predicting the size of compressed signals that may be generated by entropy encoders from transformed signals generated by applying a discrete transform method to an uncompressed signal, embodiments of the compression estimation mechanism may be used to predict the size of compressed signals generated by compression mechanisms that are not transform-based. For example, embodiments of the compression estimation mechanism may be used in other types of coders than transform coders, where the other types of coders use entropy encoders to generate compressed signals from intermediate signals generated using other techniques than discrete transforms. Further, in some embodiments the discrete transform method may be the identity transform.

Figure 2:
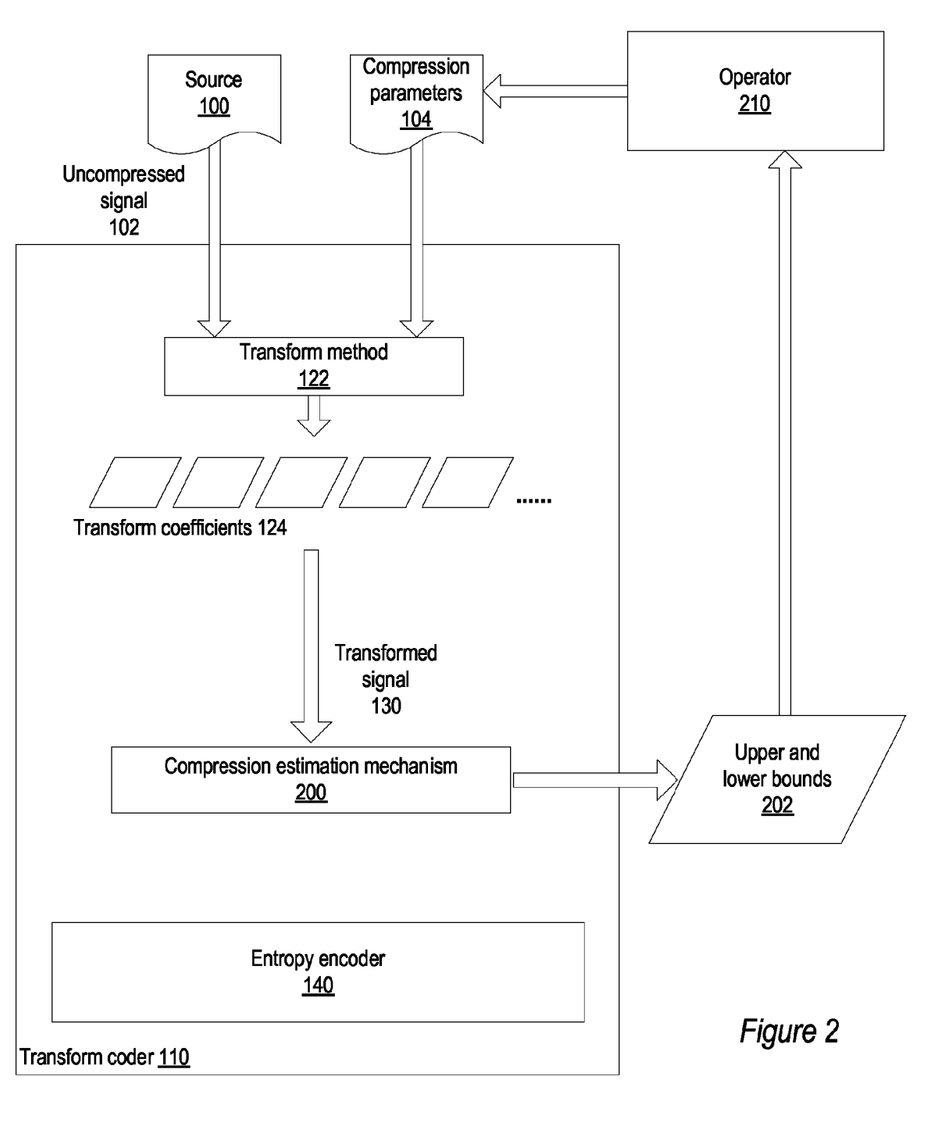
FIG. 2 illustrates data flow within a transform coder implementing a compression estimation mechanism to predict the bounds of a compressed signal according to one embodiment.

FIG. 2 illustrates data flow within a transform coder implementing a compression estimation mechanism to predict the bounds of a compressed signal according to one embodiment. Inputs to a transform coder may include an uncompressed signal 102 and one or more compression parameters 104. Compression parameters 104 may be specified by an operator 210. Note that operator 210 may be a human operator who may specify compression parameters 104 via a user interface or, alternatively, a software program. Source 100 of uncompressed signal 102 may be a discretely sampled image, audio stream, video stream, etc. Note that uncompressed signal may be a subset or portion of a larger signal, for example a portion of an image, audio stream, or digital video stream. Input compression parameters 104 may include one or more variable parameters that may be used during the compression process. Note that compression parameters 104 may affect both the compression ratio and the quality of the compressed signal 150. Generally, the quality is directly related to the compression ratio; higher rates of compression that generate smaller compressed signals 150 tend to negatively affect the quality of the compressed signals 150.

A discrete transform is performed on the uncompressed signal 102 using a transform method 122 employed by the transform coder 110 and in accordance with the compression parameters 104 to generate a vector of transform coefficients. Zero and near-zero coefficients may be discarded, and small coefficients may be quantized, concentrating meaningful information from the signal 102 into a subset of transform coefficients 124. Note that one or more of compression parameters 104 may specify quantization factors used in quantizing one or more of transform coefficients 124.

In at least some cases, operator 210 may need or desire to have a prediction of upper and lower bounds of the range bounding the size of the compressed signal that will be output by the transform coder. Operator 210, for example, may be a human operator that desires an output compressed image file to be no larger than some maximum size and/or no smaller than some minimum size. As another example, operator 210 may be an audio or video streaming application with bandwidth considerations that depend on the size of the compressed signal.

Compression estimation mechanism 200 analyzes transform coefficients 124, applying formulae that model the behavior of entropy encoders 140, to generate upper and lower bounds 202 estimates on the size of the compressed signal that would be generated by entropy encoder 140. The upper and lower bounds estimates 202 may then be provided to operator 210. For example, the upper and lower bounds 202 may be displayed on a user interface for viewing by a human operator, or fed back into a software program. Operator 210 may then adjust compression parameters 104 accordingly, if necessary or desired, to adjust the upper and lower bounds on the size of the compressed signal. Note that the operator 210 may adjust the parameters 104 to move the bounds of the compressed signal up or down, as necessary or desired. Further note that the operator 210 may perform the process more than once to determine the compression parameters 104 that yield the necessary or desired upper and lower bounds 202. Once the upper and lower bounds 202 indicate a range that is acceptable to the operator 210, the operator 210 may then signal the transform coder 110 to perform full compression of the uncompressed signal 102 to generate a compressed signal.

Note that compression estimation mechanism 200 may be implemented in hardware, software, or as a combination thereof. Further, note that compression estimation mechanism 200 may be implemented as a component of transform coder 110 or as a separate module.

Computing the Upper and Lower Bounds

The following describes several formulae that may be implemented by compression estimation mechanism 200 and that model the behavior of entropy encoders 140 and that may be applied to the transform coefficients 124 of a transformed signal 130 and used to predict the lower and upper bounds 202 on the size of a compressed signal generated by an entropy encoder 140 in various embodiments. Lower bound is abbreviated as Lb, and upper bound is abbreviated as Ub. Let I be the transformed signal and let c denote a transform coefficient. Let |I| denote the cardinality of I and let |c| denote the absolute value of c. A strong lower bound on the size of a compressed signal may be computed by the following:

$$Lb1 = \sum_{c \in I, c \neq 0} \log_2(|c|)$$

A strong upper bound may be computed by the following:

$$Ub1 = |I| * \log_2\left(1/|I| * \sum_{c \in I, c \neq 0} |c|\right)$$

Note that Lb1 and Ub1 are lower and upper bounds prediction formulae that are applicable to entropy encoders in general. The lower bound may be further improved by adding the sign information to the equation. I.e., one bit for coding the sign information of each nonzero coefficient is added:

$$Lb2 = \sum_{c \in I, c \neq 0} (\log_2(|c|) + 1)$$

Lb2 is also applicable to entropy encoders in general. The lower and upper bounds may be further improved by adding adjustment factors that may be empirically obtained by comparing the predicted upper and lower bounds with the true compressed size of several signals of particular entropy encoders. Note that the adjustment factor that is added may be different for each entropy encoder that is under consideration. Adding an adjustment factor of y for the lower bound Lb2 and z for the upper bound Ub1 yields:

$$Ub2 = |I| * \log_2\left(1/|I| * \sum_{c \in I, c \neq 0} |c|\right) + z$$

$$Lb3 = \sum_{c \in I, c \neq 0} (\log_2(|c|) + 1) + y$$

The upper and lower bounds may be computed while the transform coefficients are being generated, or alternatively in a single pass over the coefficients of the transformed signal. Thus, a prediction of the upper and lower bounds may be generated in the time it takes to perform a transform of the input signal, or at most not much longer. Conventionally, as was previously mentioned, full compression, including entropy encoding, of the input signal would generally have to be performed to determine the size of the compressed signal generated by a transform coder 110, after which adjustments to the compression parameters 104 may be made if necessary or desired, followed by another pass through the transform coder 110, and so on. Since performing entropy encoding of the transformed signal 130 generally takes much longer than performing the transform, by modeling the behavior of entropy encoders 140 and using that model to predict the upper and lower bounds of the compressed signal without performing the entropy encoding, embodiments may provide feedback on the size of the compressed signal significantly faster than the conventional trial-and-error method. In cases where an accurate compressed size is needed by the operator 210, the upper and lower bounds 202 estimate may be used to reduce the search space of the quality and other compression parameters 104.

Further adjustments may be made to generate more accurate lower and upper bounds. Lb2 and Lb3 consider the nonzero transform coefficients and their signs. However, they do not take into consideration the zero transform coefficients. Entropy encoders need to include information in the compressed signal indicating the zero transform coefficients. It will take some number of bits to specify that a particular transform coefficient is zero. Note that a simple and common way to code a significantly large number of zero transform coefficients is to record the run length of zero transform coefficients. For example, an entropy encoder may indicate "10 zeros" rather than indicating each zero transform coefficient separately. This method may typically use fewer bits to encode the information indicating zero transform coefficients than would encoding each zero transform coefficient separately. Therefore, if there are proportionally many zero transform coefficients, coding information on the zero transform coefficients may require fewer bits than if there is some smaller number of zero transform coefficients spread out sparsely.

It may thus be assumed that the zero transform coefficients may typically be compressed in proportion to the number of zero transform coefficients to nonzero transform coefficients. Thus, an estimate of the number of bits it will take to code the zero transform coefficients is to use the proportion of zero transform coefficients to nonzero transform coefficients in the transformed signal. For example, say that the number of nonzero transform coefficients is p and the number of zero transform coefficients is z. To code all of the zero coefficients would require $(p/(p+z))*z$ bits. If the number of nonzero coefficients is low in proportion to the number of zero coefficients, an entropy encoder will typically be able to code the zero coefficients in a lesser number of bits. Thus, $(p/(p+z))*z$ bits can be added into the lower bound estimate.

Lb2 and Lb3 also do not take into consideration that there is a necessity for some marker or indication to differentiate between nonzero transform coefficients in a compressed signal generated by an entropy encoder. A marker between coefficients may be included to separate the coefficients in the output stream so that the encoded coefficients can be decoded. Typically, this marker will specify the length (e.g., in bits) of the following coded coefficient. Thus, the marker will take some number of bits. For estimating the lower bound, it may be assumed that the entropy encoder will compress the markers, as a minimum, into one bit for each nonzero coefficient. Thus, if the number of nonzero transform coefficients is p, an additional p term can be added into the lower bound estimate.

For the upper bound, the difference is the number of bits needed to code the markers. For the upper bound, let a represent the average bit length of the nonzero transform coefficients in the transformed signal. Any entropy encoder should be able to specify the markers between the coefficients using at most $\log_2(a)$ bits per nonzero transform coefficient. For example, if a=10, only 4 bits are needed to specify the value 10. Thus, if the number of nonzero transform coefficients is p, an additional $\log_2(a)*p$ term can be added into the upper bound estimate.

Thus, the lower bound and upper bound may be improved by assuming that a typical entropy encoder cannot go below one bit per nonzero transform coefficient and should not go above $\log_2(a)$ bits per nonzero transform coefficient in coding the markers indicating the length of the nonzero transform coefficients, where a is the average bit length of the nonzero transform coefficients.

The above may be used to generate more accurate lower and upper bounds, given as Ub3 and Lb4 below. Let the number of nonzero transform coefficients be p and let the number of zero transform coefficients be z. Let lp be the sum of the bit lengths of the absolute values of all the nonzero coefficients. Let the average coefficient have length a:

$Ub3 = lp + p + \log_2(a)*p + (p/(p+z))*z$ $Lb4 = lp + p + p + (p/(p+z))*z$

Note that the difference between the upper bound formula Ub3 and the lower bound formula Lb4 is the factor used in computing the contribution of the markers between nonzero transform coefficients. For the lower bound, one bit per nonzero transform coefficient is used (represented by the second p factor). For the upper bound, the number of bits needed to represent the bit length of the average nonzero transform coefficient multiplied by the number of nonzero transform coefficients is used (represented by the factor $\log_2(a)*p$). For example if the length of the average positive coefficient is 10, at most 4 bits per nonzero coefficient is needed to represent the marker information. Thus, in this example, 4*p would be the estimated contribution of the markers between the nonzero transform coefficients.

Note that various embodiments of compression estimation mechanism 200 as illustrated in FIG. 2 may implement two or more of the above formulae (Ub1-Ub3, Lb1-Lb4) for modeling the behavior of entropy encoders 140 to predict the lower and upper bounds 202 on the size of a compressed signal generated by an entropy encoder 140.

Figure 3:
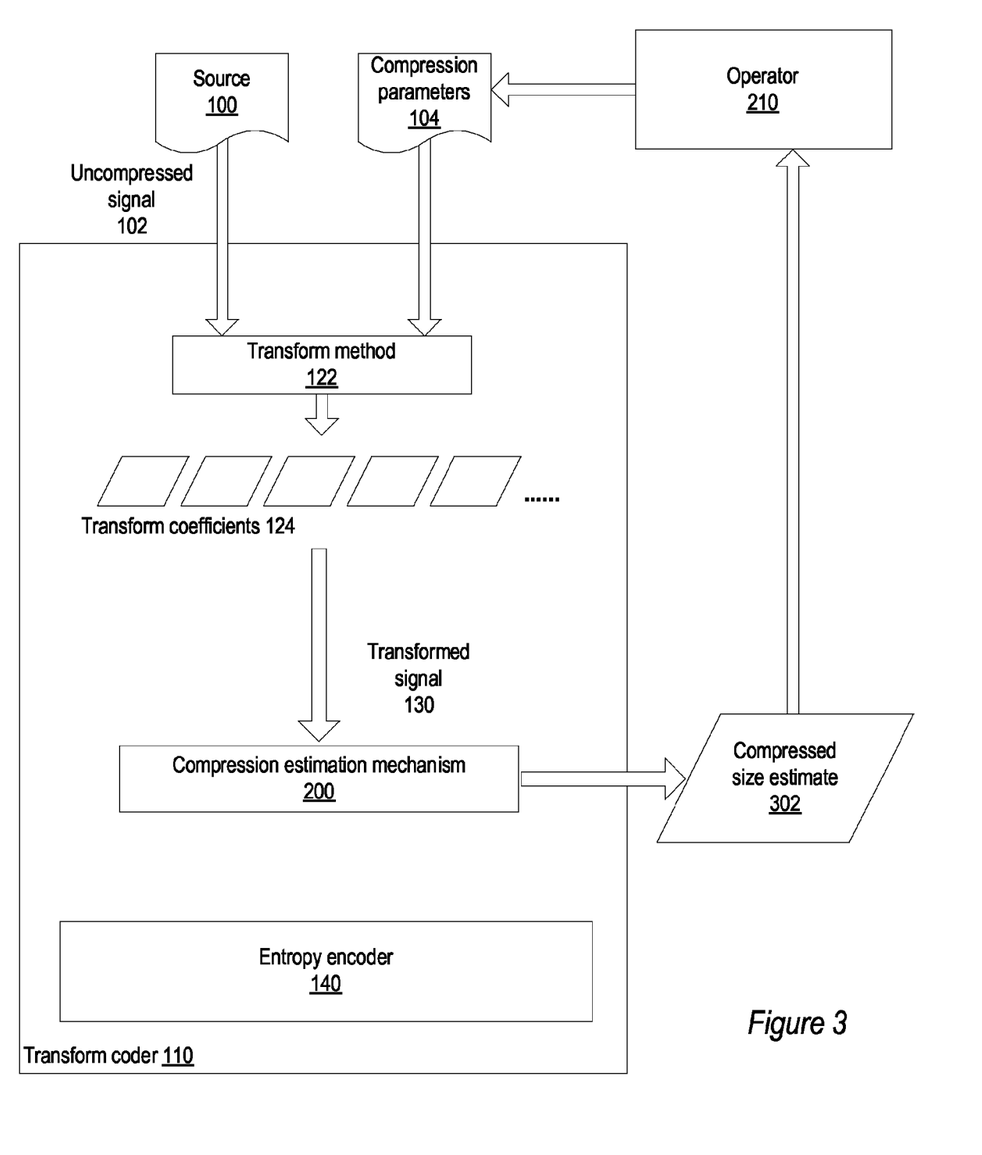
FIG. 3 illustrates data flow within a transform coder implementing a compression estimation mechanism to predict the size of a compressed signal according to one embodiment.

FIG. 3 illustrates data flow within a transform coder implementing a compression estimation mechanism in predicting the actual size, rather than an upper and lower bound for the size, of a compressed signal according to one embodiment. Inputs to a transform coder may include an uncompressed signal 102 and one or more compression parameters 104. Compression parameters 104 may be specified by an operator 210. Note that operator 210 may be a software program or alternatively a human operator that specifies compression parameters 104 via a user interface. Source 100 of uncompressed signal 102 may be a discretely sampled image, audio stream, video stream, etc. Note that uncompressed signal may be a subset or portion of a larger signal, for example a portion of an image, audio stream, or digital video stream. Input compression parameters 104 may include one or more variable parameters that may be used during the compression process. Note that compression parameters 104 may affect both the compression ratio and the quality of the compressed signal 150. Generally, the quality is directly related to the compression ratio; higher rates of compression that generate smaller compressed signals 150 tend to negatively affect the quality of the compressed signals 150.

A discrete transform is performed on the uncompressed signal 102 using a transform method 122 employed by the transform coder 110 and in accordance with the compression parameters 104 to generate a vector of transform coefficients. Zero and near-zero coefficients may be discarded, and small coefficients may be quantized, concentrating meaningful information from the signal 102 into a subset of transform coefficients 124. Note that one or more of compression parameters 104 may specify quantization factors used in quantizing one or more of transform coefficients 124.

In at least some cases, rather than a prediction of the upper and lower bounds on the size of the compressed signal from an entropy encoder 140, operator 210 may need or desire to have a prediction of the actual size of the compressed signal that will be output by the transform coder 110 within some degree of accuracy. Operator 210, for example, may be a human operator that desires an output compressed image file to be at or near some particular size. As another example, operator 210 may be an audio or video streaming application with bandwidth considerations that depend on the size of the compressed signal.

Compression estimation mechanism 200 analyzes transform coefficients 124, applying formulae that model the behavior of entropy encoders 140, to generate a prediction of the actual size of the compressed signal that would be generated by entropy encoder 140. The compressed size estimate 302 may then be provided to operator 210. For example, the compressed size estimate 302 may be displayed on a user interface for viewing by a human operator, or fed back into a software program. Operator 210 may then adjust compression parameters 104 accordingly, if necessary or desired, to adjust the size of the compressed signal. Note that the operator 210 may adjust the size of the compressed signal to be larger or smaller, as necessary or desired. Further note that the operator 210 may perform the process more than once to determine the compression parameters 104 that yield the necessary or desired compressed size estimate 302. Once a compressed size estimate 302 that is acceptable to the operator 210 is found, the operator 210 may then signal the transform coder 110 to perform full compression of the uncompressed signal 102 to generate a compressed signal.

The following describes an exemplary method that may be implemented by compression estimation mechanism 200 to generate compressed size estimate 302. Note that this method is exemplary and not intended to be limiting; other embodiments may implement other methods or variations on this method to generate compressed size estimate 302.

Compressed Size Prediction Using Least Squares Estimation

Let the transformed signal 130 have z coefficients 124 that are zero and p coefficients 124 that are nonzero. The parts that go into the compressed output file or stream are:

The nonzero coefficient bits—let the total number of nonzero coefficient bits be represented by lp and assume that lp is compressed by factor a, yielding a total of a*lp bits.

The zero bits—let the zero bits be represented by z and assume they get compressed by a factor b yielding a total of b*z bits.

The sign information for the nonzero coefficients—assume they get compressed by a factor c, yielding c*p bits. Note that p is the number of nonzero coefficients. Sign information is necessary only for nonzero coefficients.

The length information (or marker information) for each nonzero coefficient. Assume the length information gets compressed by a factor d, yielding d*p bits Length information is necessary only for nonzero coefficients. Unless the length of each coefficient is specified, the compressed file could not be decoded.

A factor k.

Summing up the components listed above yields the equation:

$$S=(a*lp+b*z+c*p+d*p)+k$$

where S is the compressed size estimate in bits and $0<=(a,b,c)<=1$, $d>=0$, and the factor k is unconstrained. Note that the factor k may be added as a "fudge factor" or adjustment factor that is determined from one or more size metrics derived from a set of compressed signals generated by actually compressing a number of different input signals with a particular transform coder. If such empirical testing determines that generated size estimates tend to be off by some percentage for that transform coder, then a factor k may be added as an adjustment for the error. Alternatively, the k factor may not be included or may be set to zero.

Note that the above equation is a linear equation in five unknowns. In order to empirically estimate a, b, c, d and k, a set of input signals may be compressed using a specific entropy encoding algorithm to generate a set of equations by substituting the size of each of the actual compressed signals for S in the formula $S=(a*lp+b*z+c*p+d*p)+k$. This will result in an over-constrained system that may be solved using a standard technique (e.g., least squares estimation) to determine the values of a, b, c, d and k that best fit the actual data. The best fit is in the sense that the sum of the squared errors between the predicted size and the actual values are minimized; i.e., a line is generated that best fits the data. Note that this data may also be used to generate a confidence range for the compressed size estimate 302. For example, a confidence range of +/−5% may be expressed for a generated compressed size estimate 302.

Note that, in practice, using at least some transform coders, the nonzero coefficient bits (lp) and the sign information for the nonzero coefficients may not actually be compressed by much. Thus, in one embodiment, the equation:

$$S=(a*lp+b*z+c*p+d*p)+k$$

may be simplified by assuming that a=1, c=1, and k=0, thereby yielding a linear equation in two unknowns:

$$S=(lp+b*z+p+d*p)$$

The compression factors b, and d may then be empirically estimated, for example as described above for the linear equation in five unknowns.

Note that the factors that are determined using the above method are specific to the particular entropy encoding algorithm employed. For example, JPEG and JPEG2000 will yield different values for the factor. Further, the above method does not predict upper and lower bounds on the compressed size.

In one embodiment, the empirical testing by compressing several input signals to estimate the factors a, b, c, d and k (or, alternatively, b and d) may be performed once for a particular transform coder. The factors may then be "hardcoded" in the compression estimation mechanism or otherwise provided to the compression estimation mechanism. In one embodiment, the factors may be empirically determined by compressing a set of input streams for a particular application of a particular transform coder; or for a particular type of input stream into a particular implementation of a compression standard, for example a JPEG2000 implementation. In one embodiment, the factors may be empirically determined by a user; in other words, in this embodiment, a user may "train" an application that employs a transform coder implementing an embodiment of the compression estimation mechanism using a set of input signals selected by the user that are representative of the type(s) of input signal the user expects to compress using the application.

Figure 4:
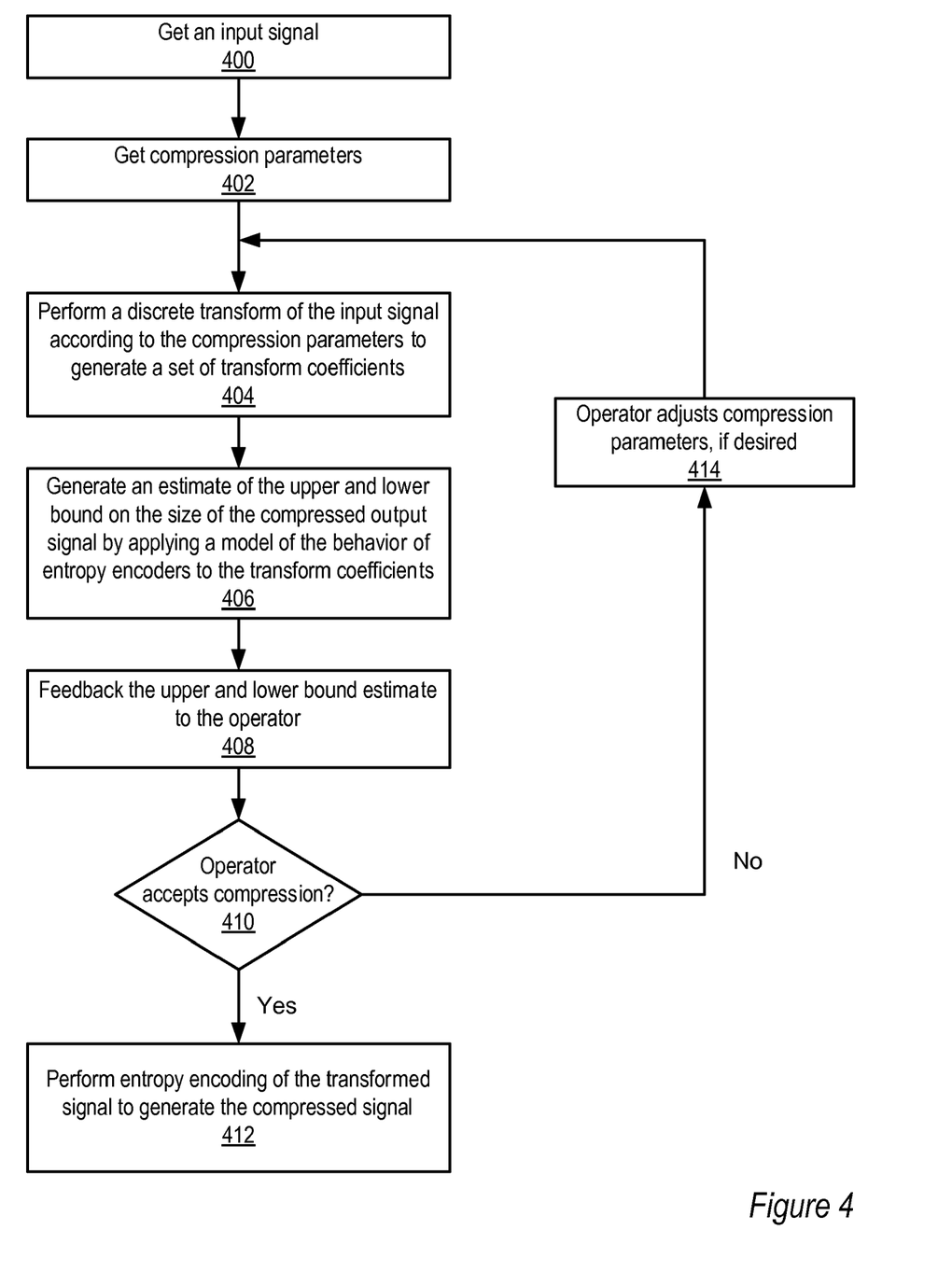
FIG. 4 is a flowchart of a method for providing an estimate of the size of a compressed signal without actually fully compressing the signal according to one embodiment.

FIG. 4 is a flowchart of a method for providing an estimate of the size of a compressed signal without actually fully compressing the signal according to one embodiment. A transform coder may receive an input signal as indicated at 400. The input signal may be, but is not limited to, a digital image such as a digital photograph, a digitized audio signal, a video stream or video segment, etc. An operator may specify one or more compression parameters that may affect the quality and size of the compressed signal, as indicated at 402. Note that the operator may be a software program or alternatively a human operator who may specify the compression parameters via a user interface or, alternatively.

As indicated at 404, the transform coder may perform a discrete transform of the input signal according to the compression parameters and using a transform method implemented by the transform coder to generate a set of transform coefficients. As indicated at 406, a compression estimation mechanism may then generate an estimate of the upper bound and lower bound on the size of the compressed signal by applying a model of the behavior of entropy encoders to the transform coefficients. Various formulae that model the behavior of entropy encoders and that may be used for estimating the lower and upper bound have been previously described. Note that the compression estimation mechanism may implement any one of these formulae or variations thereof. Note that, in one embodiment, instead of, in addition to, or as an alternative to generating an estimate of the lower and upper bound from the transform coefficients, the compression estimation mechanism may generate an estimate of the size of the compressed signal within a range of confidence. Further note that the compression estimation mechanism generates the estimates by applying a formula that models the behavior of entropy encoders to the transform coefficients generated by the discrete transform, and that entropy encoding of the transformed signal is not performed to generate the upper and lower bound or the alternative size estimate.

As indicated at 408, the transform coder may feedback the upper and lower bound estimate (or, alternatively, the size estimate with confidence range) to the operator. If the operator is a human operator, the upper and lower bound estimate and/or compressed size estimate may be displayed to the operator via a user interface.

At 410, the operator may examine the upper and lower bound estimate (or size estimate) to determine if the compressed output size is acceptable. If the compressed output size as indicated by the upper and lower bound estimate (or size estimate) is acceptable to the operator, the operator may accept or OK the compression of the input stream, and entropy encoding of the transformed signal may then be performed to generate the compressed signal, as indicated at 412. Note that, in one embodiment, since the discrete transform has already been performed, it is not necessary to again perform the discrete transform of the input signal; entropy encoding of the previously generated transformed signal may be performed to generate the compressed signal.

At 410, if the compressed output size as indicated by the upper and lower bound estimate (or size estimate) is not acceptable to the operator, the operator may adjust the compression parameters, if necessary or desired, as indicated at 414. As indicated at 404, the transform coder may then again perform a discrete transform of the input signal according to the adjusted compression parameters and the discrete transform method implemented by the transform coder to generate a new set of transform coefficients. Note that, in one embodiment, the full discrete transform may not have to be performed, as transform coefficients generated by the previous discrete transform(s) may be saved, and one or more of the saved transform coefficients may be used as-is without regenerating them if the adjusted compression parameters do not affect the particular transform coefficients. For example, if only quantization factors are changed, the unquantized transform coefficients generated by the previous discrete transform(s) may be saved and re-used, and thus only the quantization portion of the process needs to be performed to generate a modified set of transform coefficients. As indicated at 406, the compression estimation mechanism may then generate a new estimate of the upper bound and lower bound on the size of the compressed signal (or, alternatively, a new size estimate), which may then be fed back to the operator. The process may be repeated until an acceptable upper and lower bounds estimate (or, alternatively, a size estimate) is found. Note again that entropy encoding of the transformed signal is not performed to determine the upper and lower bounds estimate (or size estimate); entropy encoding of the transformed signal is not performed until the operator accepts the upper and lower bounds estimate (or size estimate) as determined by the compression estimation mechanism.

Exemplary Applications

Applications of embodiments of compression estimation mechanism 200 to model the behavior of entropy encoders to predict the upper and lower bounds and/or to predict the actual size of a compressed output stream may include any application, program, module, etc. that uses a transform coder 110 to compress any type of input signal. Note again that embodiments of the compression estimation mechanism 200 may be used with any transform coding scheme; the modeling of entropy encoders 140 performed by compression estimation mechanism 200 as described herein is independent of the particular transform method 122 and entropy encoder 140 used by the transform coder 110. The following are some exemplary applications that may implement embodiments of compression estimation mechanism 200, and are not intended to be limiting.

Embodiments of compression estimation mechanism 200 may be implemented in image, video, and/or audio encoding applications that provide a user interface through which a user may adjust the desired quality level and size of a compressed output file or stream to be generated by a transform coder 110 from a specified input file or stream. In general, the higher the quality of the compressed output file, the larger the size of the compressed output file. The user may, for example, need or desire to sacrifice some quality to achieve a necessary or desired smaller output file size. An embodiment of compression estimation mechanism 200 implemented in such an application may, for example, provide fast feedback to the user on the upper and lower bounds of the size of the compressed output file, allowing the user to quickly adjust the quality to meet a desired compressed file size, if necessary, without actually performing the full compression.

Embodiments of compression estimation mechanism 200 may be implemented in any application that provides a mechanism to perform batch compression of a set of input files using a transform coder 110 to provide a quick estimate of the upper and lower bounds on the total size of the compressed output files without fully compressing the set of input files. As an example, in such an application, a user may select a set of two or more files to be compressed and copied onto a different storage media. The application, via compression estimation mechanism 200, may provide feedback to the user on the upper and lower bounds on the total size of the compressed output files before fully compressing and copying the files. If the upper and lower bounds indicate that the compressed files may not fit on the target media, the user may adjust the quality to reduce the size of the compressed output files, if desired.

Embodiments of compression estimation mechanism 200 may be implemented in video conferencing applications where a compression module needs to know the size of the compressed output stream from transform coding of an input stream so that the compression module can make decisions on the quality of a video segment depending on currently available bandwidth. Since video segment compression and transmission generally need to be performed in as near real time as possible, the application cannot afford to first fully compress the video segment only to discover that the compressed size is too large for the available bandwidth, and to then search for the right size by trial and error. An embodiment of compression estimation mechanism 200 implemented in such an application may provide fast feedback on the upper and lower bounds of the compressed output stream to the compression module that allows the module to adjust the quality of the video segment to match currently available bandwidth without having to perform full compression of the video segment. Thus, embodiments may allow video conferencing applications (and other similar streaming applications) to quickly and automatically increase or decrease the image/video quality based on the currently available bandwidth.

Exemplary User Interface

Figure 5:
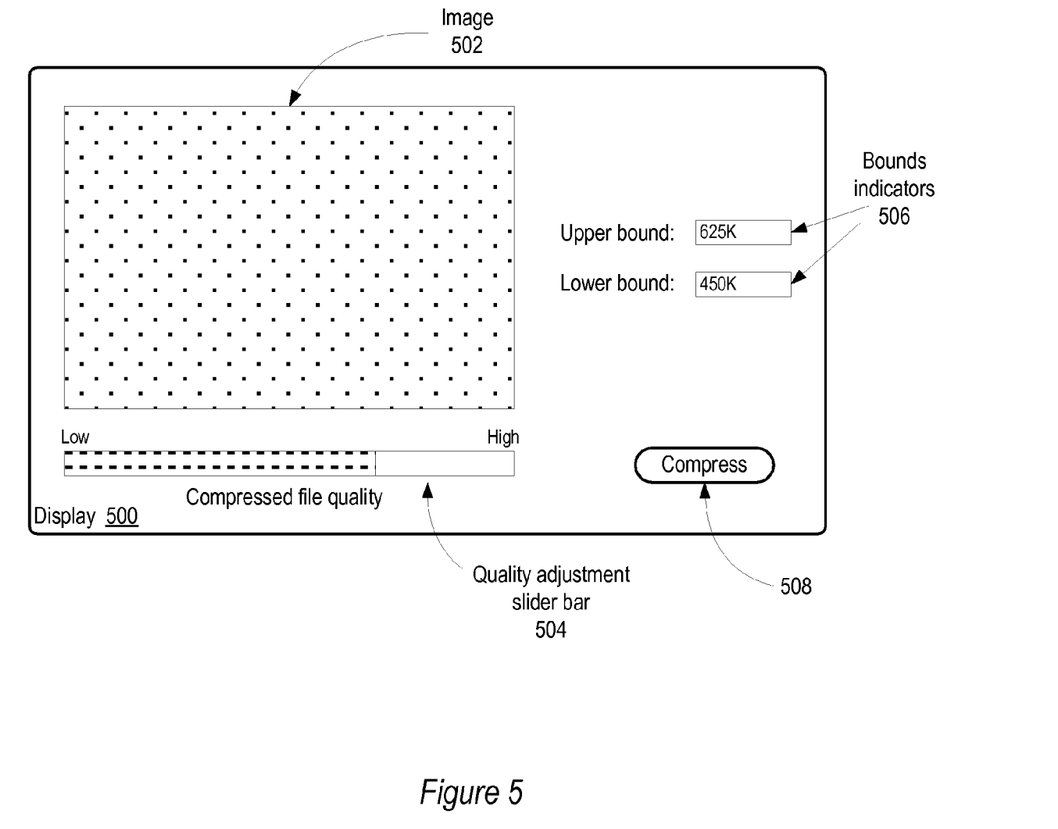
FIG. 5 illustrates an exemplary user interface for a compression estimation mechanism for estimating the bounds of a compressed input digital image, according to one embodiment.

FIG. 5 illustrates an exemplary user interface for a compression estimation mechanism for estimating the bounds of a compressed input digital image, according to one embodiment. This or a similar user interface may, for example, be implemented in a digital image processing application that provides a user interface through which a user may adjust the desired quality level and compressed size of a compressed output file to be generated from a specified input image using a transform coder. In general, the higher the quality of the compressed output file, the larger the size of the compressed output file. The user may, for example, need or desire to sacrifice some quality to achieve a necessary or desired smaller output file size. An embodiment of compression estimation mechanism implemented in such an application may, for example, provide fast feedback to the user on the upper and lower bounds of the size of the compressed output file at various levels of quality, allowing the user to quickly adjust the quality to meet a desired compressed file size, if necessary, without actually performing the full compression.

FIG. 5 shows an exemplary display 500 that includes several exemplary user interface items or elements. Display 500 may include a quality adjustment slider bar 504 that may be adjusted up or down by the user to select a higher or lower level of compressed image quality. Note that other types of user interface elements may be used to adjust the quality; for example, a dial, a popup menu, or a text entry box may be used to adjust the quality. Further note that, as an alternative to being displayed as a "quality adjustment" user interface item, a slider bar or similar user interface item may be displayed as a "compression ratio adjustment" user interface item, via which the user may adjust the compression ratio up or down. Display 500 may also include the image 502 or a portion of the image 502 displayed approximately as it would appear at the current level of quality as indicated by quality adjustment slider bar 504, provided as a preview of the quality of the compressed signal to the user. Note that, for audio and video input signals, the user interface may provide audio and video previews of the compressed signal. Display 500 may also include user interface items (bounds indicators 506) that show the estimated upper and lower bounds on the size of the compressed output file at the current level of quality as determined by the compression estimation mechanism. Note that, while FIG. 5 shows bounds indicators 506 as textual display items, other user interface mechanisms may be used to display the estimated upper and lower bounds. As the user adjusts the quality adjustment slider bar 504 up or down, the compression estimation mechanism may recalculate the upper and lower bounds, and the bounds indicators 506 may be updated with the new values for the upper and lower bounds. The displayed image 502 may also change to indicate the new level of quality.

A similar display may be used in applications for adjusting the compressed output quality of other types of signals (e.g., audio and video signals) and for displaying the estimated upper and lower bounds on the size of the compressed output file at user-specified levels of quality as determined by the compression estimation mechanism. Further, a similar display may be used in applications to show an estimated size of the compressed output file (as an alternative to the upper and lower bounds) at user-specified levels of quality as determined by the compression estimation mechanism.

Exemplary System

Figure 6:
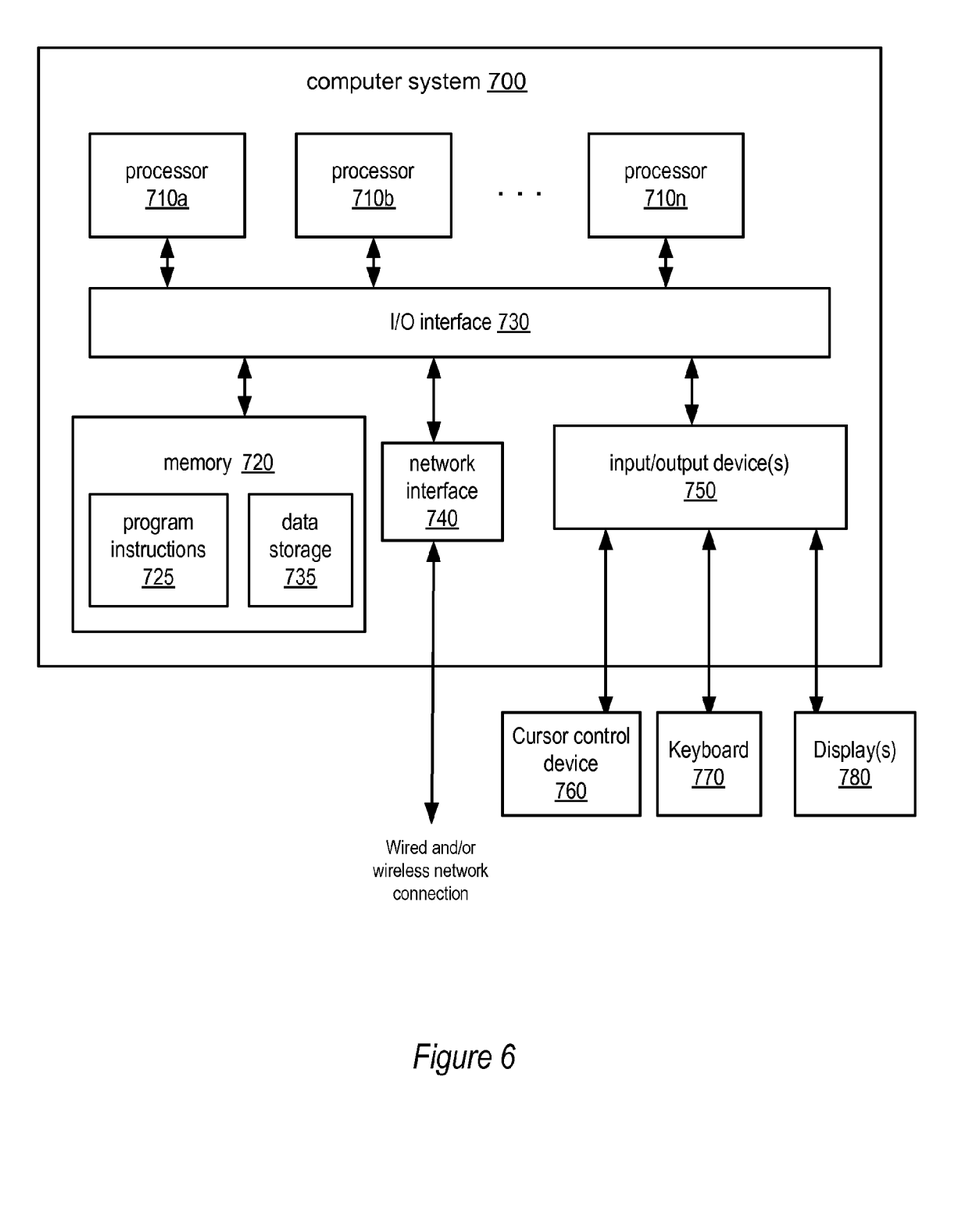
FIG. 6 illustrates an exemplary computer system on which embodiments may be implemented.

Various embodiments of a compression estimation mechanism as described herein may be executed on one or more computer systems, which may interact with various other devices. One such computer system is illustrated by FIG. 6. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the compression estimation mechanism, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 9, memory 720 may include program instructions 725, configured to implement embodiments of the compression estimation mechanism as described herein, and data storage 735, comprising various data accessible by program instructions 725. In one embodiment, program instructions 725 may include software elements of a transform coder implementing a compression estimation mechanism as illustrated in FIGS. 2 and 3. Data storage 735 may include data that may be used in some embodiments. In other embodiments, different software elements and data may be included.

Those skilled in the art will appreciate that computer system 700 is merely illustrative and is not intended to limit the scope of the compression estimation mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   performing a discrete transform of a digital input signal according to one or more compression parameters, wherein said discrete transform generates a transformed signal comprising a set of transform coefficients; and
   generating a prediction of the size of a compressed signal that would be generated by an entropy encoding of the transformed signal by applying one or more formulae that model the behavior of entropy encoders to the set of transform coefficients;
   wherein said generating a prediction of the size of a compressed signal is performed without an entropy encoder performing actual entropy encoding of the transformed signal.

2. The method as recited in claim 1, wherein said generating a prediction of the size of the compressed signal comprises generating an upper bound estimate on the size of the compressed signal and a lower bound estimate on the size of the compressed signal.

3. The method as recited in claim 2, wherein the lower bound estimate is generated in accordance with a lower bound formula that sums the bit lengths of all nonzero transform coefficients in the set of transform coefficients.

4. The method as recited in claim 3, wherein the lower bound formula adds one to the lower bound estimate for each nonzero transform coefficient to account for the sign of the nonzero transform coefficient.

5. The method as recited in claim 3, wherein the lower bound formula adds an adjustment factor for a particular entropy encoder to the lower bound estimate, wherein the adjustment factor is empirically determined from one or more size metrics derived from a set of compressed signals generated by compressing a set of discretely transformed digital input signals with the particular entropy encoder.

6. The method as recited in claim 3, wherein the lower bound formula accounts for entropy encoding of all zero transform coefficients in the set of transform coefficients by adding $(p/(p+z))*z$ bits to the lower bound estimate, where p represents the number of nonzero transform coefficients and z represents the number of zero transform coefficients.

7. The method as recited in claim 3, wherein the lower bound formula adds one to the lower bound estimate for each nonzero transform coefficient to account for markers between the nonzero transform coefficients.

8. The method as recited in claim 2, wherein the lower bound estimate is generated in accordance with a lower bound formula $Lb=lp+p+p+(p/(p+z))*z$, where:
   Lb represents the lower bounds estimate;
   lp represents the total number of bits for the nonzero transform coefficients;
   p represents the number of nonzero transform coefficients in the set of transform coefficients; and
   z represents the number of zero transform coefficients in the set of transform coefficients.

9. The method as recited in claim 2, wherein the upper bound estimate is generated in accordance with an upper bound formula that computes an average bit length of all nonzero transform coefficients in the set of transform coefficients and multiplies the average bit length by the number of nonzero transform coefficients.

10. The method as recited in claim 9, wherein the upper bound formula adds an adjustment factor for a particular entropy encoder to the upper bound estimate, wherein the adjustment factor is empirically determined from one or more size metrics derived from a set of compressed signals generated by compressing a set of discretely transformed digital input signals with the particular entropy encoder.

11. The method as recited in claim 10, wherein the adjustment factor is a negative number.

12. The method as recited in claim 9, wherein the upper bound formula accounts for entropy encoding of all zero transform coefficients in the set of transform coefficients by adding $(p/(p+z))*z$ bits to the upper bound estimate, where p represents the number of nonzero transform coefficients and z represents the number of zero transform coefficients.

13. The method as recited in claim 9, wherein the upper bound formula accounts for markers between the nonzero transform coefficients by adding the number of bits needed to represent the bit length of the average nonzero transform coefficient multiplied by the number of nonzero transform coefficients to the upper bound estimate.

14. The method as recited in claim 2, wherein the upper bound estimate is generated in accordance with an upper bound formula $Ub=lp+p+\log_2(a)*p+(p/(p+z))*z$, where:
   Ub represents the upper bound estimate;
   lp represents the total number of bits for the nonzero transform coefficients;
   p represents the number of nonzero transform coefficients in the set of transform coefficients;
   a represents the average bit length of the nonzero transform coefficients in the set of transform coefficients; and z represents the number of zero transform coefficients in the set of transform coefficients.

15. The method as recited in claim 1, wherein said generating a prediction of the size of the compressed signal comprises generating an estimate of the actual size of the compressed signal.

16. The method as recited in claim 15, wherein said generating a prediction of the size of the compressed signal further comprises generating a confidence range for the estimate of the actual size of the compressed signal.

17. The method as recited in claim 15, wherein the estimate of the actual size of the compressed signal is generated in accordance with a compressed size estimate formula $S=a*lp+b*z+c*p+d*p+k$, where:
S represents the compressed size estimate in bits;
p represents the number of nonzero transform coefficients in the set of transform coefficients;
lp represents the total number of bits for the nonzero transform coefficients;
z represents the total number of bits for the zero transform coefficients in the set of transform coefficients;
a represents a compression factor for lp;
b represents a compression factor for z;
c represents a compression factor for sign information for the nonzero transform coefficients;
d represents a compression factor for marker information for the nonzero transform coefficients;
k represents an adjustment factor; and
$0<=(a,b,c)<=1$.

18. The method as recited in claim 17, further comprising empirically estimating the compression factors a, b, c, d, and k for a specific entropy encoder.

19. The method as recited in claim 18, wherein said empirically estimating the compression factors a, b, c, d, and k for a specific entropy encoder comprises:
compressing a set of discretely transformed digital input signals with the specific entropy encoder to generate a set of actual compressed signals;
generating an over-constrained system comprising a set of equations of the form $S=a*lp+b*z+c*p+d*p+k$, wherein, for each of the equations, the size of a corresponding one of the actual compressed signals is substituted for S; and
solving the over-constrained system to find the compression factors a, b, c, d, and k for the specific entropy encoder.

20. The method as recited in claim 19, wherein said solving the over-constrained system is performed using least squares estimation.

21. The method as recited in claim 17, further comprising setting the factor a to 1, the factor c to 1, and the factor k to 0 in the compressed size estimate formula to yield the formula $S=(lp+b*z+p+d*p)$.

22. The method as recited in claim 1, further comprising providing said prediction of the size of the compressed signal to an operator.

23. The method as recited in claim 22, wherein the operator is one of a human operator or a software program.

24. The method as recited in claim 22, wherein the operator is a human operator, and wherein the method further comprises providing said prediction of the size of the compressed signal and a preview of the quality of the compressed signal to the human operator via a user interface.

25. The method as recited in claim 22, further comprising initiating the entropy encoding of the transformed signal to generate the compressed signal if the prediction of the size of the compressed signal is accepted by the operator.

26. The method as recited in claim 22, further comprising:
receiving a modified one or more compression parameters from the operator;
performing another discrete transform of the digital input signal according to the modified one or more compression parameters, wherein said discrete transform generates a different transformed signal comprising a different set of transform coefficients; and
generating a new prediction of the size of a compressed signal that would be generated by an entropy encoding of the different transformed signal by applying the one or more formulae that model the behavior of entropy encoders to the different set of transform coefficients; and
providing said new prediction of the size of the compressed signal to the operator.

27. The method as recited in claim 1, wherein one or more of said compression parameters specify quantization factors, and wherein the method further comprises quantizing one or more of said transform coefficients in accordance with the one or more quantization factors.

28. The method as recited in claim 1, wherein the digital input signal is one of a digital image input signal, a digital audio input signal, and a digital video input signal.

29. The method as recited in claim 1, wherein said generating a prediction of the size of a compressed signal is performed independently of a particular discrete transform method used to perform the discrete transform.

30. The method as recited in claim 1, wherein said generating a prediction of the size of a compressed signal is performed independently of a particular entropy encoding technique.

31. A system, comprising:
at least one processor; and
a memory comprising program instructions, wherein the program instructions are executable by the at least one processor to:
perform a discrete transform of a digital input signal according to one or more compression parameters, wherein said discrete transform generates a transformed signal comprising a set of transform coefficients; and
generate a prediction of the size of a compressed signal that would be generated by an entropy encoding of the transformed signal by applying one or more formulae that model the behavior of entropy encoders to the set of transform coefficients;
wherein said prediction of the size of a compressed signal is generated without an entropy encoder performing actual entropy encoding of the transformed signal.

32. The system as recited in claim 31, wherein, to generate a prediction of the size of the compressed signal, the program instructions are further executable by the at least one processor to generate an upper bound estimate on the size of the compressed signal and a lower bound estimate on the size of the compressed signal.

33. The system as recited in claim 32, wherein the lower bound estimate is generated in accordance with a lower bound formula that sums the bit lengths of all nonzero transform coefficients in the set of transform coefficients.

34. The system as recited in claim 33, wherein the lower bound formula adds one to the lower bound estimate for each nonzero transform coefficient to account for the sign of the nonzero transform coefficient.

35. The system as recited in claim 33, wherein the lower bound formula adds an adjustment factor for a particular entropy encoder to the lower bound estimate, wherein the adjustment factor is empirically determined from one or more size metrics derived from a set of compressed signals generated by compressing a set of discretely transformed digital input signals with the particular entropy encoder.

36. The system as recited in claim 33, wherein the lower bound formula accounts for entropy encoding of all zero transform coefficients in the set of transform coefficients by adding $(p/(p+z))*z$ bits to the lower bound estimate, where p represents the number of nonzero transform coefficients and z represents the number of zero transform coefficients.

37. The system as recited in claim 33, wherein the lower bound formula adds one to the lower bound estimate for each nonzero transform coefficient to account for markers between the nonzero transform coefficients.

38. The system as recited in claim 32, wherein the upper bound estimate is generated in accordance with an upper bound formula that computes an average bit length of all nonzero transform coefficients in the set of transform coefficients and multiplies the average bit length by the number of nonzero transform coefficients.

39. The system as recited in claim 38, wherein the upper bound formula adds an adjustment factor for a particular entropy encoder to the upper bound estimate, wherein the adjustment factor is empirically determined from one or more size metrics derived from a set of compressed signals generated by compressing a set of discretely transformed digital input signals with the particular entropy encoder.

40. The system as recited in claim 38, wherein the upper bound formula accounts for entropy encoding of all zero transform coefficients in the set of transform coefficients by adding $(p/(p+z))*z$ bits to the upper bound estimate, where p represents the number of nonzero transform coefficients and z represents the number of zero transform coefficients.

41. The system as recited in claim 38, wherein the upper bound formula accounts for markers between the nonzero transform coefficients by adding the number of bits needed to represent the bit length of the average nonzero transform coefficient multiplied by the number of nonzero transform coefficients.

42. The system as recited in claim 32, wherein the upper bound estimate is generated in accordance with an upper bound formula $Ub=lp+p+\log_2(a)*p+(p/(p+z))*z$, where:
   Ub represents the upper bound estimate;
   lp represents the total number of bits for the nonzero transform coefficients;
   p represents the number of nonzero transform coefficients in the set of transform coefficients;
   a represents the average bit length of the nonzero transform coefficients in the set of transform coefficients; and
   z represents the number of zero transform coefficients in the set of transform coefficients.

43. The system as recited in claim 31, wherein the lower bound estimate is generated in accordance with a lower bound formula $Lb=lp+p+(p/(p+z))*z$, where:
   Lb represents the lower bounds estimate;
   lp represents the total number of bits for the nonzero transform coefficients;
   p represents the number of nonzero transform coefficients in the set of transform coefficients; and
   z represents the number of zero transform coefficients in the set of transform coefficients.

44. The system as recited in claim 31, wherein, to generate a prediction of the size of the compressed signal, the program instructions are further executable by the at least one processor to generate an estimate of the actual size of the compressed signal.

45. The system as recited in claim 44, wherein, to generate a prediction of the size of the compressed signal, the program instructions are further executable by the at least one processor to generate a confidence range for the estimate of the actual size of the compressed signal.

46. The system as recited in claim 44, wherein the estimate of the actual size of the compressed signal is generated in accordance with a compressed size estimate formula $S=a*lp+b*z+c*p+d*p+k$, where:
   S represents the compressed size estimate in bits;
   p represents the number of nonzero transform coefficients in the set of transform coefficients;
   lp represents the total number of bits for the nonzero transform coefficients;
   z represents the total number of bits for the zero transform coefficients in the set of transform coefficients;
   a represents a compression factor for lp;
   b represents a compression factor for z;
   c represents a compression factor for sign information for the nonzero transform coefficients;
   d represents a compression factor for marker information for the nonzero transform coefficients;
   k represents an adjustment factor; and
   $0<=(a,b,c)<=1$.

47. The system as recited in claim 46, wherein the program instructions are further executable by the at least one processor to:
   compress a set of discretely transformed digital input signals with a specific entropy encoder to generate a set of actual compressed signals;
   generate an over-constrained system comprising a set of equations of the form $S=a*lp+b*z+c*p+d*p+k$, wherein, for each of the equations, the size of a corresponding one of the actual compressed signals is substituted for S; and
   solve the over-constrained system to find the compression factors a, b, c, d, and k for the specific entropy encoder.

48. The system as recited in claim 31, wherein the program instructions are further executable by the at least one processor to provide said prediction of the size of the compressed signal to an operator, wherein the operator is one of a human operator or a software program.

49. The system as recited in claim 48, wherein the system further comprises a display device coupled to the at least one processor, wherein the operator is a human operator, and wherein the program instructions are further executable by the at least one processor to provide said prediction of the size of the compressed signal and a preview of the quality of the compressed signal to the human operator via a user interface displayed on the display device.

50. The system as recited in claim 48, wherein the program instructions are further executable by the at least one processor to initiate the entropy encoding of the transformed signal to generate the compressed signal if the prediction of the size of the compressed signal is accepted by the operator.

51. The system as recited in claim 48, wherein the program instructions are further executable by the at least one processor to:
   receive a modified one or more compression parameters from the operator;
   perform another discrete transform of the digital input signal according to the modified one or more compression parameters, wherein said discrete transform generates a different transformed signal comprising a different set of transform coefficients; and
   generate a new prediction of the size of a compressed signal that would be generated by an entropy encoding of the different transformed signal by applying the one or more formulae that model the behavior of entropy encoders to the different set of transform coefficients; and provide said new prediction of the size of the compressed signal to the operator.

52. The system as recited in claim 31, wherein the digital input signal is one of a digital image input signal, a digital audio input signal, and a digital video input signal.

53. The system as recited in claim 31, wherein said generating a prediction of the size of a compressed signal is performed independently of a particular discrete transform method used to perform the discrete transform, and wherein said generating a prediction of the size of a compressed signal is performed independently of a particular entropy encoding technique.

54. A computer-readable storage medium comprising program instructions, wherein the program instructions are computer-executable to implement:

performing a discrete transform of a digital input signal according to one or more compression parameters, wherein said discrete transform generates a transformed signal comprising a set of transform coefficients; and generating a prediction of the size of a compressed signal that would be generated by an entropy encoding of the transformed signal by applying one or more formulae that model the behavior of entropy encoders to the set of transform coefficients;

wherein said generating a prediction of the size of a compressed signal is performed without an entropy encoder performing actual entropy encoding of the transformed signal.

* * * * *